United States Patent [19]

Bounds

[11] 4,311,283
[45] Jan. 19, 1982

[54] CONDIMENT GRATER

[76] Inventor: William E. Bounds, P. O. Box 1547, Torrance, Calif. 90505

[21] Appl. No.: 170,015

[22] Filed: Jul. 18, 1980

[51] Int. Cl.³ ............................................. A47J 42/34
[52] U.S. Cl. ..................................... 241/95; 241/168; 241/273.2
[58] Field of Search ..... 241/95, 168, 169, 273.1–273.4

[56] References Cited

U.S. PATENT DOCUMENTS

| | | | |
|---|---|---|---|
| D. 273,576 | 11/1975 | Cyren | 241/168 X |
| 473,051 | 4/1892 | Abbott | 241/273.2 X |
| 823,446 | 6/1906 | Schuster et al. | |
| 853,725 | 5/1907 | Newton | 241/95 |
| 944,241 | 12/1909 | Jordan | 241/168 X |
| 1,077,482 | 11/1913 | Lippincott | |
| 1,182,541 | 5/1916 | Egge | |
| 1,739,342 | 12/1929 | Andrusis | |
| 2,627,377 | 2/1953 | Fletcher | |
| 3,489,357 | 1/1970 | Takahashi | 241/95 |
| 3,552,460 | 1/1971 | Cooney | 241/95 |
| 3,679,460 | 7/1972 | Kaishita et al. | 241/95 |
| 4,082,230 | 4/1978 | Bounds | 241/169.1 |

Primary Examiner—Howard N. Goldberg
Attorney, Agent, or Firm—Edward A. Sokolski

[57] ABSTRACT

A condiment grater suitable for grating condiment such as nutmeg and for storing such condiment. The device includes a holder device which holds the condiment and a cranking mechanism such that the condiment can be rotatably driven against a stationary blade member which is fixedly mounted on the bottom of the housing of the device. The condiment holder member is held in tight gripping engagement with the condiment by means of a spring member which is placed between the housing and the holder member and rotates with the holder member as the cranking mechanism is manually rotated. The upper portion of the device has a windowed compartment for storing the condiment.

8 Claims, 6 Drawing Figures

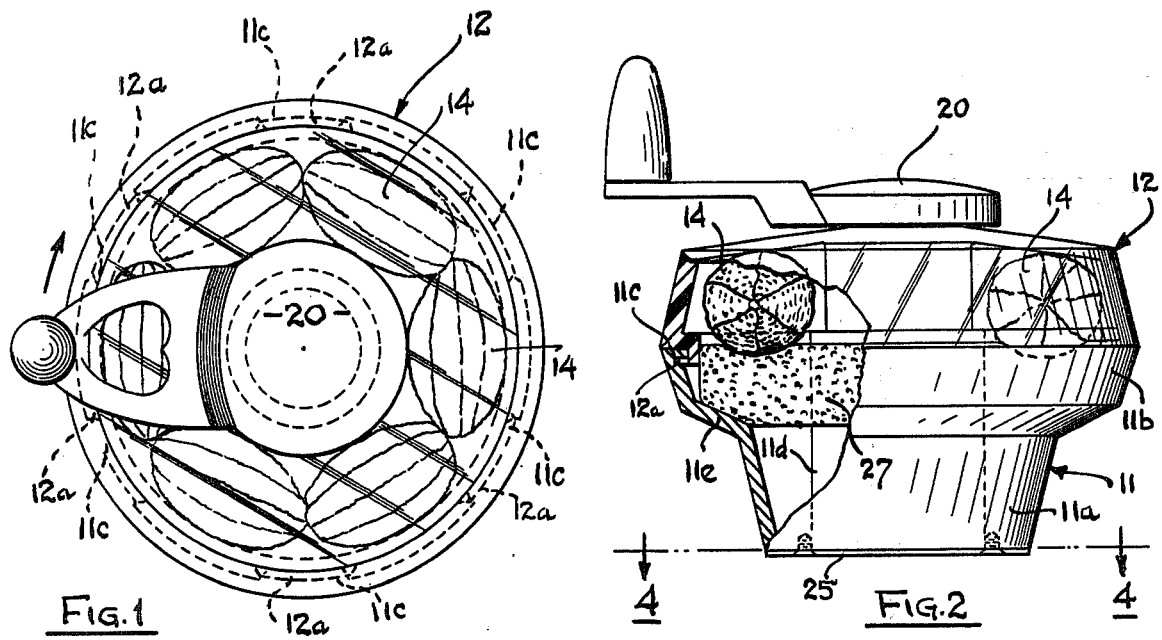
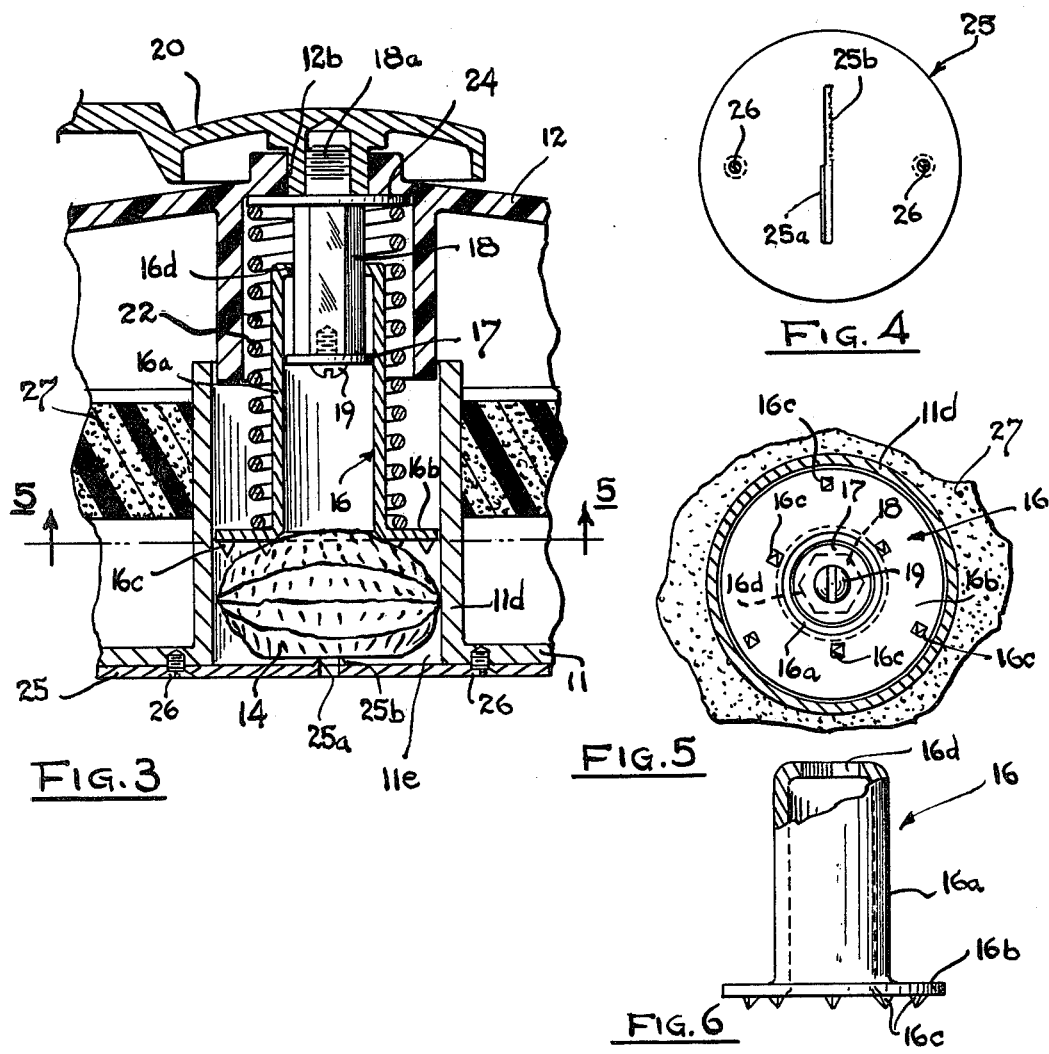

CONDIMENT GRATER

This invention relates to condiment graters, and more particularly to such a grater suitable for grating nutmeg which has a storage compartment for storing such condiment and which includes a drive mechanism for rotatably driving the condiment against a fixed grater member.

Condiment graters of the type generally employed for grating nutmeg are oftentimes rather cumbersome units that have little cosmetic attraction and tend to be overly expensive and complicated in their construction. Further, very few of these units are suitable for use on the dining table along with pepper grinders and the like. Having the condiment grinder right at the dining table, of course, has the advantage of enabling the user to freshly grind the nutmeg or other condiment onto his food to his own satisfaction.

The device of the present invention is an improved condiment grater particularly suitable for grating nutmeg which is of relatively compact proportions and of economical construction, and which is capable of efficiently grating nutmeg. Further, the device of the present invention has a highly attractive appearance such that it is suitable for use right at the dining table. In addition, the device of the present invention includes a storage compartment for storing the condiment prior to its being grated so that a fresh supply is immediately available for the user right at the table.

It is therefore an object of this invention to provide an improved grater device suitable for grating condiment right at the user's table.

It is a further object of this invention to provide an improved grater device which is of simple, economical construction, yet which is capable of highly efficient grating action.

It is still a further object of this invention to provide an improved grater device for condiment, such as nutmeg, having a storage compartment with a transparent cover so that the raw condiment is on view through such cover.

It is still another object of this invention to facilitate grating of a raw condiment, such as nutmeg, right at the user's dining table.

Other objects of this invention will become apparent as the description proceeds in connection with the accompanying drawings of which:

FIG. 1 is a top plan view of a preferred embodiment of the invention;

FIG. 2 is a side elevational view of the preferred embodiment with partial section cut away;

FIG. 3 is a cross sectional view of the central portion of the preferred embodiment;

FIG. 4 is a view taken along the plane indicated by 4—4 in FIG. 2;

FIG. 5 is a cross-sectional view taken along the plane indicated by 5—5 in FIG. 3; and FIG. 6 is a side-elevational view of the holder member of the preferred embodiment.

Briefly described, the device of the present invention includes a lower housing portion having an opening in the bottom thereof in which a blade member is removably mounted. Fitted over the lower housing, which housing also forms a base for the unit, is a cover member which is preferably transparent and which with the base member forms a compartment for storing the raw condiment. The cover member is retained to the lower housing or base member by means of interlocking flanges on these two members.

A holder member for retaining the condiment while it is being grated is mounted within the housing of the device and coupled to a manual crank mechanism for rotational drive thereby, the holder member being spring urged downwardly by a spring placed between the cover and such holder member, thereby urging the condiment against the blades of the blade member. Thus, when the crank mechanism is rotated, the condiment is rotated against the blade edges and the condiment thereby grated.

Referring now to the figures, a preferred embodiment of the invention is illustrated. Lower housing 11 has a base portion 11a which has a generally truncated conical form which base portion is stepped inwardly by means of truncated conical portion 11e from the top portion 11b of the lower housing which also has a generally truncated conical shape. Removably fitted onto the top portion 11b of the lower housing is a cover member 12 which forms the top of the housing. Cover member 12 is retained to the lower housing portion 11 by means of interlocking flange portions 12a of the cover which matingly engage and fit under flange portions 11c of the lower housing. Thus, the cover portion 12 can be removed from the lower housing by rotating the two portions relative to each other and can be similarly reattached by placing the two members in a proper relative position and rotating one of the members relative to the other to bring the flanges into locking engagement as shown in the figures.

The raw condiment 14, which may comprise nutmeg nuts, is stored within the cover portion 12 of the housing, this portion preferably being of a transparent plastic so that the nutmeg is in view.

Mounted within the housing between the cover member 12 and the inner upstanding cylindrical wall 11d of the lower housing 11 is condiment holder or retainer member 16. Holder member 16 has a cylindrical portion 16a which extends upwardly from a flat washer-shaped portion 16b. Washer-shaped portion 16b has a plurality of spikes 16c which extend downwardly from the lower surface thereof, these spikes being used to engage the raw condiment 14 to be grated. Holder member 16 has a hexagonally apertured top 16d through which hexagonal post member 18 is fitted in mating keyed engagement therewith. Washer 17 is attached to post member 18 by means of screw 19, this post member having an undercut threaded portion 18a at the top end thereof. Cover 12 has a circular aperture 12b formed at the center of the top wall thereof, the threaded portion 18a of post 18 fitting through this aperture and being threadably attached to hand crank mechanism 20. Spring 22 is compressed between washer portion 16b of holder 16 and a flat washer 24 which abuts against the inner top wall of cover member 12. Thus, when crank mechanism 20 is rotated, post member 18 is rotated and rotatably drives holder member 16. The raw condiment 14, which is held by holder member 16, is thereby driven against blades 25a and 25b.

Mounted in circular opening 11e at the bottom of the lower housing is a disc shaped blade member 25, this blade member being attached to the lower housing by means of screws 26. Blade member 25 has a pair of longitudinal blades 25a and 25b which are end-to-end to each other. Blades 25a and 25b preferably have their end-to-end interface at or near the center of cutter member 25. Blade 25a is straight-edged while blade 25b has a serrated edge. Thus, when the condiment 14 is rotatably driven against blade 25b, lands and grooves will be formed on the surface of the condiment, the grated particles falling from the grater. Blade 25a will, on the next half turn, pass over the grooved portion formed by blade 25b and slice off the land portions thereof, leaving a smooth surface for the next cut of serrated blade 25b. In this fashion, the condiment is efficiently grated with a minimum loss of material.

In disassembling and assembling the unit for putting new raw condiment therein, cover 12 is first removed by rotating it relative to the lower housing until the interlocking flanges 11c and 12a are separated from each other so that the cover can be lifted off. When the cover is lifted off, it also carries with it the condiment holder member 16 and the crank member 20, both of which are retained to the cover by means of post member 18. Old condiment can then be removed from spikes 16c and new condiment placed in engagement with the spikes. The cover is then reinserted in locking engagement with the lower housing 11 with spring 22 being compressed such that it drives the holder member downwardly against the condiment 14. Condiment 14 is thereby resiliently driven into tight engagement with the blades of cutter member 25 so that when crank 20 is rotated, a grating action will occur. The serrated blade 25b, it is to be noted, extends inwardly and upwardly from the flat surface of cutter member 25 so that it effectively digs into the condiment. The same is also true for straight-edged blade 25a.

In order to provide cushioning so as to prevent damage to the raw condiment 14, a cushioning pad 27 of a soft resilient material, such as polyurethane foam, is placed in the top 11b of the lower housing portion 11. This cushioning pad 27 bottoms against the inner wall of the stepped truncated conical portion 11e of the lower housing which joins together base portion 11a and top portion 11b.

While the invention has been described and illustrated in detail, it is to be clearly understood that this is intended by way of illustration and example only and is not to be taken by way of limitation, the spirit and scope of this invention being limited only by the terms of the following claims.

I claim:

1. A grater for grating condiment comprising
a lower housing portion having an opening in the bottom thereof,
a blade member mounted in the opening of said lower housing portion,
said blade member including a pair of end-to-end longitudinal blades, one of said blades having a straight edge, the other of said blades having a serrated edge,
a cover member removably fitted onto said lower housing portion, a compartment being formed between said cover member and said lower housing portion for storing condiment,
a holder member for retaining the condiment while it is being grated, said holder member include means on the bottom thereof for removably retaining the condiment to the holder member,
a manual crank mechanism,
means for rotatably supporting said crank mechanism on said cover member,
means for coupling said crank mechanism to said holder member in driving engagement therewith, and
means for urging said holder member axially away from said cover member with the condiment retained thereby in engagement with the blade means,
whereby when the crank mechanism is rotated, the condiment is driven against the edges of the longitudinal blades and grated thereby, the serrated edge forming lands and grooves in the condiment and said straight edge shaving off the lands leaving a smooth surface for the next cut of the serrated edge.

2. The grater of claim 1 wherein said blade member is disc shaped, the interface between said blades being substantially at the center of said disc.

3. The grater of claim 1 wherein said lower housing portion and cover member have substantially truncated conical forms.

4. The grater of claim 1 wherein said cover member is transparent to permit viewing of condiment stored therein.

5. The grater of claim 1 or 2 wherein the means on the bottom of said holder member for retaining the condiment comprises a washer-shaped portion having a plurality of spikes extending from the lower surface thereof.

6. The grater of claim 5 wherein said means for urging said holder member away from the cover member comprises a coil spring placed in compression between the washer shaped portion on the bottom of the holder member and the cover member.

7. The grater of claim 1 wherein said means for rotatably supporting said crank mechanism on said cover member and said means for coupling said crank mechanism to said holder member comprises a post member having a threaded portion on one end thereof, said threaded portion being threadably attached to said crank mechanism, said post member having a driving key portion with a predetermined cross sectional shape, said holder member having an aperture in the top portion thereof with a cross sectional shape similar to that of said post member key portion, said key portion being fitted through said aperture in mating keyed engagement with the walls thereof.

8. The grater of claim 1 and further including a cushioning pad placed in said housing portion for cushioning the condiment stored therein.

* * * * *